(12) United States Patent
Schneider

(10) Patent No.: US 8,412,932 B2
(45) Date of Patent: Apr. 2, 2013

(54) COLLECTING ACCOUNT ACCESS STATISTICS FROM INFORMATION PROVIDED BY PRESENCE OF CLIENT CERTIFICATES

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 878 days.

(21) Appl. No.: 12/039,152

(22) Filed: Feb. 28, 2008

(65) Prior Publication Data
US 2009/0222901 A1    Sep. 3, 2009

(51) Int. Cl.
H04L 29/06    (2006.01)
(52) U.S. Cl. .............. 713/164; 726/2; 726/5; 726/9; 726/10; 726/15; 726/18; 713/171; 713/168; 713/186; 713/175; 713/183; 713/156; 713/182
(58) Field of Classification Search .......... 726/10, 726/5, 18, 2, 9, 15; 713/156, 173, 175, 172, 713/171, 168, 186, 183, 182
See application file for complete search history.

(56) References Cited

U.S. PATENT DOCUMENTS

| | | | | |
|---|---|---|---|---|
| 5,757,920 A * | 5/1998 | Misra et al. | | 713/158 |
| 5,815,574 A * | 9/1998 | Fortinsky | | 713/153 |
| 5,999,711 A * | 12/1999 | Misra et al. | | 726/4 |
| 6,442,696 B1 * | 8/2002 | Wray et al. | | 726/5 |
| 6,807,577 B1 * | 10/2004 | Gillespie et al. | | 709/227 |
| 7,484,089 B1 * | 1/2009 | Kogen et al. | | 713/156 |
| 2002/0078346 A1 * | 6/2002 | Sandhu et al. | | 713/156 |
| 2002/0138728 A1 * | 9/2002 | Parfenov et al. | | 713/170 |
| 2002/0184217 A1 * | 12/2002 | Bisbee et al. | | 707/9 |
| 2003/0084350 A1 * | 5/2003 | Eibach et al. | | 713/201 |
| 2004/0268152 A1 * | 12/2004 | Xia et al. | | 713/201 |
| 2005/0015594 A1 * | 1/2005 | Ashley et al. | | 713/168 |
| 2006/0026421 A1 * | 2/2006 | Gasparini et al. | | 713/156 |
| 2006/0179003 A1 * | 8/2006 | Steele et al. | | 705/59 |
| 2007/0016782 A1 * | 1/2007 | Crall et al. | | 713/175 |
| 2007/0150737 A1 * | 6/2007 | Parupudi et al. | | 713/175 |
| 2007/0220595 A1 * | 9/2007 | M'raihi et al. | | 726/5 |
| 2008/0072311 A1 * | 3/2008 | Mullick et al. | | 726/15 |
| 2009/0055642 A1 * | 2/2009 | Myers et al. | | 713/155 |
| 2009/0064307 A1 * | 3/2009 | Holar et al. | | 726/12 |
| 2009/0106549 A1 * | 4/2009 | Mohamed | | 713/156 |

OTHER PUBLICATIONS

Housley, et. al., "RFC 3280, Internet X.509 Public Key Infrastructure Certificate and Certificate Revocation List (CRL) Profile", Apr. 2002, Network Working Group (see attachment NPL_12039152_rfc3280).*

* cited by examiner

Primary Examiner — Jeffrey Pwu
Assistant Examiner — Hee Song
(74) Attorney, Agent, or Firm — Lowenstein Sandler LLP

(57) ABSTRACT

A method and system for collecting account access statistics from information provided by client certificates. In one embodiment, the method comprises requesting client certificates from remote terminals that request to access a computing resource. The method further comprises updating the account access statistics based on information provided by presence or absence of the client certificates and contents of the client certificates for the client certificates that are present.

14 Claims, 5 Drawing Sheets

COLLECTING ACCOUNT ACCESS STATISTICS FROM INFORMATION PROVIDED BY PRESENCE OF CLIENT CERTIFICATES

TECHNICAL FIELD

Embodiments of the present invention relate to computer security, and more specifically, to managing access to a computer system using client certificates.

BACKGROUND

Traditionally, computer systems use a centralized account database to manage user accounts and access control. However, as computer systems become more and more distributed with thousands to even millions of users, this centralized control becomes unwieldy. The problems of the centralized control range from network delays caused by the geographical distance to the centralized database, to inefficiency in the access to the centralized database caused by the sheer number of users.

Certificates can often simplify these problems. Certificates can be widely distributed, issued by numerous parties, and verified by examining their contents without having to refer to a centralized database. A user can obtain a client certificate from a trusted third-party organization, which is usually referred to as a certification authority, and submit the client certificate in a login request to identify the system from which the login request originates.

Conventionally, a host system uses the client certificate issued to a user's client system to authenticate the user. Thus, as part of the login process, the user is required to submit the client certificate to gain access to the host system. The use of the client certificates has greatly improved the management of account access. However, the use of client certificates has traditionally been limited to authentication during a login process.

BRIEF DESCRIPTION OF THE DRAWINGS

The present invention is illustrated by way of example, and not by way of limitation, in the figures of the accompanying drawings and in which.

DETAILED DESCRIPTION

Figure 1:
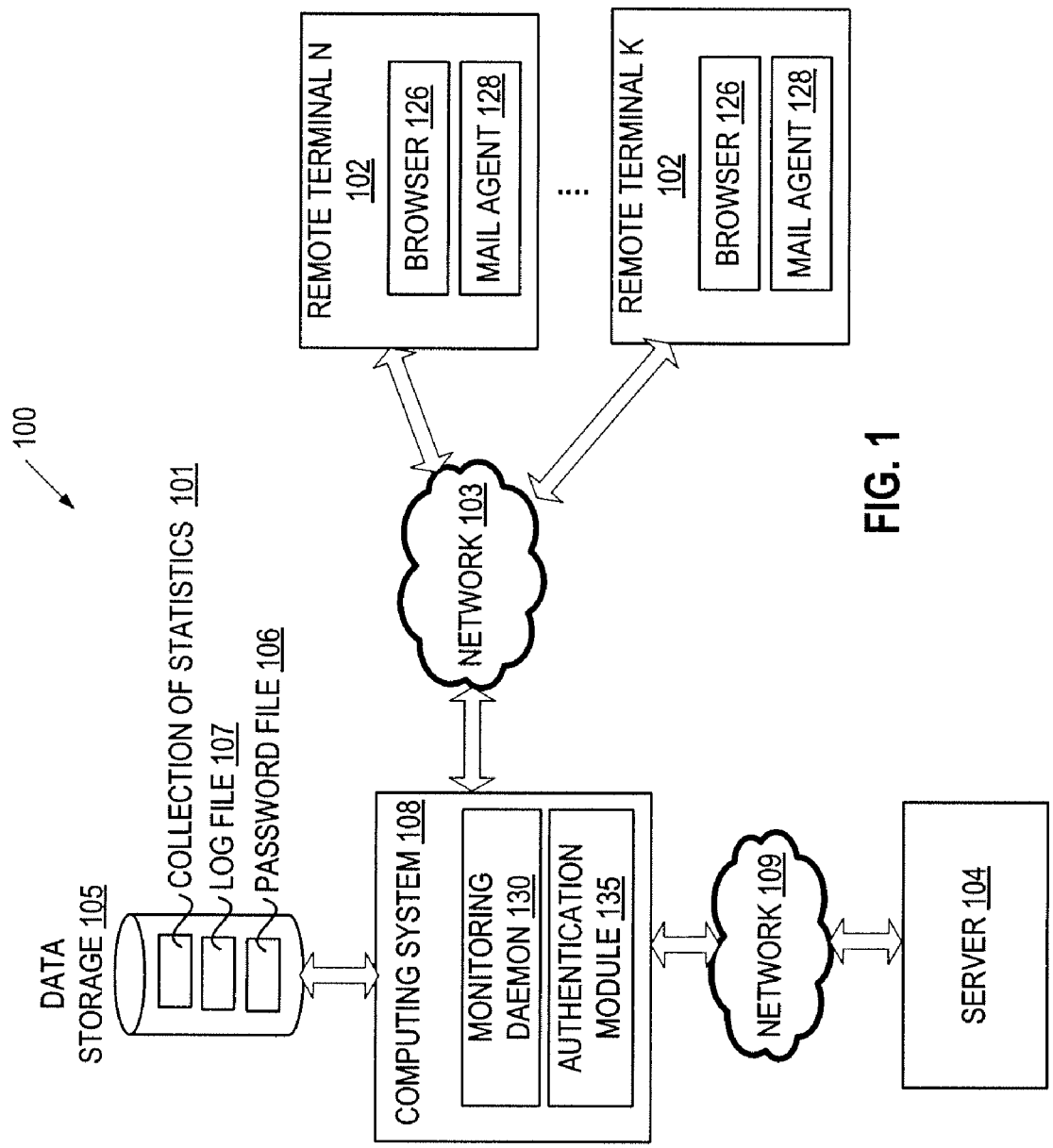
FIG. 1 illustrates a network architecture in which embodiments of the present invention may be implemented.

Described herein is a method and system for collecting account access statistics based on the information provided by the presence of client certificates. In one embodiment, account access statistics is collected based on whether client certificates are present or absent, as well as the contents of those client certificates that are present. The client certificates are submitted in a request to access a computing resource through authorized user accounts. From the account access statistics, an inference can be drawn to determine whether the users are in compliance with a policy issued by a controlling entity of the computing resource. The policy may be issued to improve computer security and data integrity.

One feature of the technique described herein is that the use of a client certificate is not limited to authentication during a login process. Rather, information in connection with the presence of a client certificate is exploited to determine a behavior pattern of a specific user or users in the aggregate. In some embodiments, a server hosting a computing resource may request, without requiring, a client certificate for accessing the resource. That is, the server will request a remote terminal to send a client certificate, but the remote terminal will be permitted to access the resource even if the remote terminal does not send the client certificate as requested. Thus, the server may allow a user to use the resource while collecting statistics relating to account access. Information provided by a client certificate may be combined with access credentials (e.g., a user name and a password) of a user to determine additional statistics relating to account access. These statistics may be used to detect existing or potential security problems in the computing environment of an organization.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "requesting", "updating", "collecting", "denying", "identifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary network architecture 100 in which embodiments of the present invention may operate. The network architecture 100 includes one or more remote terminals 102, a computing system 108, a server 104, and networks 103 and 109. The remote terminals 102 may be, for example, personal computers (PCs), mobile phones, palm-sized computing devices, personal digital assistants (PDAs), and the like. Each remote terminal 102 may install application software for accessing data from hosts (e.g., a server 104) via networks 103 and 109. The application software may include, but is not limited to, one or more of a web browser 126 and a mail agent 128 (e.g., a mail reading software, such as Microsoft Office Outlook or Mozilla Thunderbird).

The server 104 provides computing resources for the remote terminals 102. In one embodiment, the server 104 may be a web server that hosts a website, a mail server that holds and distributes email, a file server, or a server that hosts other computing resources. The server 104 may contain a server front end responsible for network communications, plugins for server functions (such as web or mail administration), a basic directory tree containing server-related data, and a database back end plugin responsible for managing the storage and retrieval of data.

In one scenario, the remote terminals 102 do not have direct access to the resources on the server 104. Rather, the remote terminals 102 access the resources on the server 104 via the computing system 108. The computing system 108 may be a computer, a server, or any other computing devices. In this scenario, the computing system 108 acts as a proxy for the server 104 and performs user authentication for the server 104. To authenticate a user, in one embodiment, the computing system 108 runs a monitoring daemon 130 and an authentication module 135. The monitoring daemon 130 runs in the background to monitor activities and collect statistics relating to each of the accounts managed by the computing system 108. The authentication module 135 includes a collection of code libraries, with functions that can be called by the computing system 108. The authentication module 135 authenticates users to see if they are who they say they are, and determines whether a user has permission to engage in an activity. Further, the authentication module 135 manages, updates, and expires passwords. In one embodiment, the authentication module 135 can update the account access statistics in real time during the login process. In another embodiment, the authentication module 135 can be implemented to include the functionality of monitoring daemon 130. Thus, the computing system 108 may include only the authentication module 130 to perform both statistics collection and password management. The authentication module 130 may be implemented on top of the Linux® operating system or other operating systems.

In the embodiment shown in FIG. 1, the computing system 108 stores and manages a password file 106, a log file 107 and a collection of statistics 101 in data storage 105. The data storage 105 may comprise mass storage devices, such as magnetic or optical storage based disks or tapes. One or more of the password file 106, the log file 107 and the collection of statistics 101 may also be stored in internal memory or caches of computing system 108. In one embodiment, the password file 106 contains passwords and user names for the accounts managed by the computing system 108. The log file 107 contains a history of activities and events associated with the accounts, and the collection of statistics 101 contains one or more account access statistics relating to the use of computing resources hosted by the server 104. The collection of the account access statistics will be described in greater detail with reference to FIGS. 2-4.

It is understood that, in an alternative scenario, the remote terminals 102 may have direct access to the server 104 without going through the computing system 108. In this alternative scenario, the server 104 would perform the authentication, authorization, and statistics collection functions by running the monitoring daemon 130 and the authentication module 135. The server 104 would also have access to the password file 106, the log file 107 and the collection of statistics 101.

The remote terminals 102 are coupled to the computing system 108 and server 104 via the networks 103 and 109, which may be public networks (e.g., Internet) or private networks (e.g., Ethernet, Local Area Networks (LANs), or corporate intranets), or a combination of both. Networks 103 and 109 may be part of the same network system or belong to different network systems.

Figure 2:
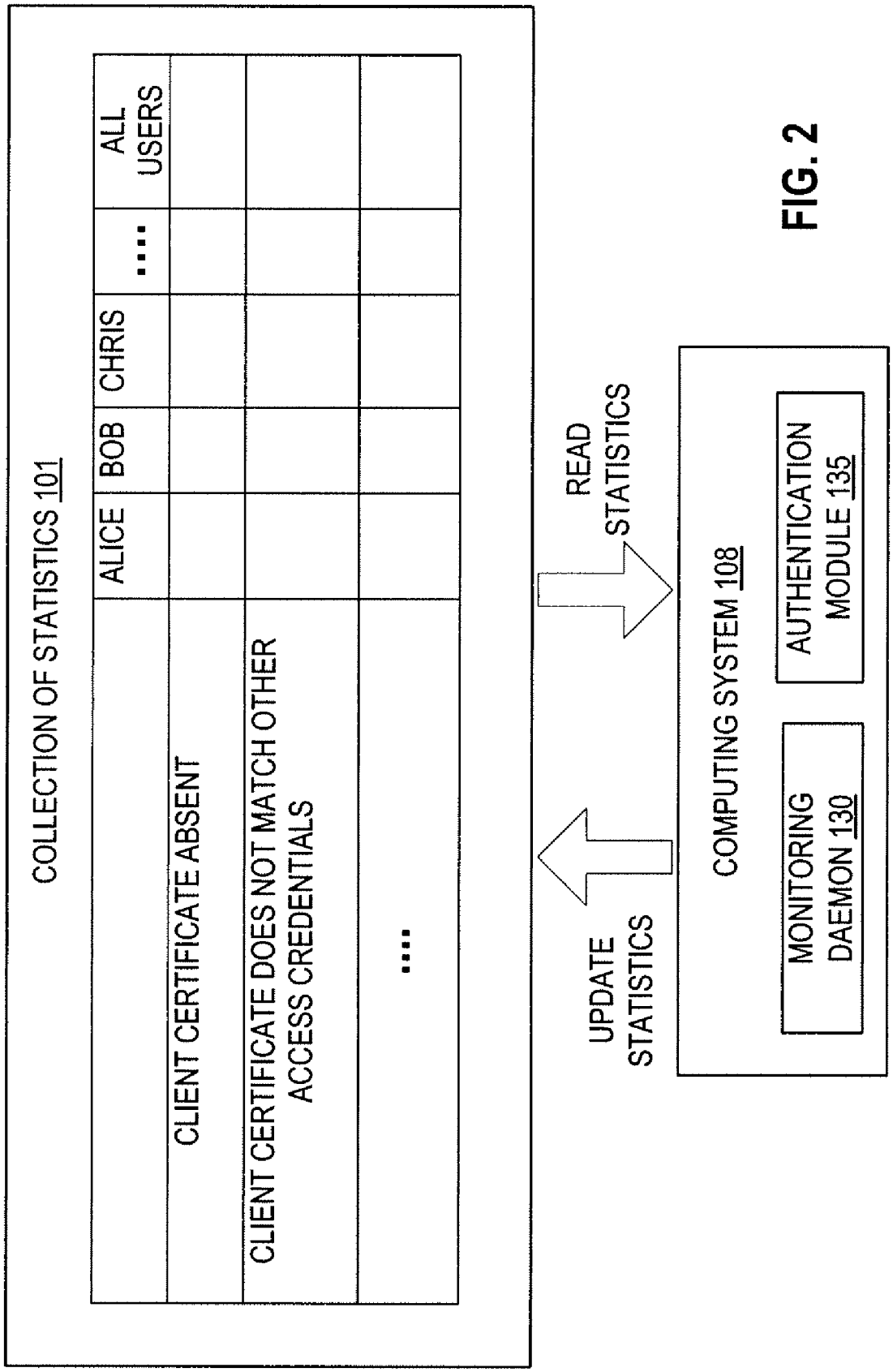
FIG. 2 illustrates an example of a collection of statistics obtained from information provided by the presence of client certificates.

FIG. 2 illustrate an example of the collection of statistics 101. In one embodiment, the collection of statistics 101 includes a number of statistics that are gathered when predetermined events occur. For example, an event may occur when a client certificate is absent in a login request. An event may also occur when information in the client certificate does not match access credentials (e.g., a user name and a password) of a user. Other events may occur based on other information that can be obtained from a client certificate and/or access credentials of a user. For the occurrence of each event, statistics can be gathered for each individual account holder, as well as all of the users in the aggregate. The collection of statistics 101 may be reviewed by a system administrator or a manager of a company to determine whether its employees have complied with a company's policy regarding the use of its computing resources.

In FIG. 2, the account access statistics are calculated by exploiting the information in connection with the client certificates. A client certificate is used on a secure connection, such as a connection to a secure website or a company mail server. A client certificate accompanies a login request to identify the source of the request. A client certificate is issued by a certification authority. Typically, a company manages its own certification authority to issue client certificates for use with its own systems. Alternatively, the certification authority can be a trusted third-party organization. A client certificate is provided to every company-owned computer by the technical support staff of the company. A client certificate contains information that identifies an organization (such as the company) and a system from which a login request is sent (such as a company-owned computer, e.g., the remote terminal 102 of FIG. 1).

For example, a standard X.509 certificate contains a version number, a serial number, signature algorithm ID, issuer name, validity period, subject name, subject public key information, and a signature. The subject name of an X509 certificate is the "distinguished name" of an entity to whom the certificate was issued. The "distinguished name" is a data structure with one or more properties that declare parts of a name, such as the city, state/province and country where the entity resides, the organization and organizational unit to which the entity belongs, and, typically, the common name of the owning entity. For secure server certificates, the common name field can be set to the fully-qualified domain name of the server. A fully-qualified domain name is an unambiguous domain name that specifies the exact location in the tree hierarchy of the domain name system (DNS). For client certificates, the common name field can be set to an account name, a machine identifier, a login name, or the like. For example, the common name field of a client certificate installed on Alice's computer can be a serialized data structure, containing "org_id=15; account_id=1713; login_name=alice" to indicate that this client certificate comes from Alice's computer.

In some embodiments, the presence of a client certificate may be used to indicate whether a request comes from a company-owned computer or a non-company-owned computer. Thus, a company can track the usage of its web server or mail server to determine the frequency of the requests that come from company-owned computers vs. non-company-owned computers. To provide a high-level of security, a company may configure its server to deny access by anyone who fails to submit a client certificate. However, to provide some flexibility to its employees' work environment, the company may determine to discourage, without prohibiting, access by non-company-owned computers. At the same time, the company may wish to monitor any potential misuses of its computing resources. Providing flexibility and guarding against misuse may be achieved simultaneously by requesting, without requiring, client certificates at logins. Thus, when an employee habitually fails to login from a company-owned computer, it indicates that there may be a problem in connection with the employee's computer or his awareness of the company's computing policies. From presence/absence of client certificates, existing or potential security problems can be detected and corrected before serious security breach occurs.

The following example illustrates the use of presence/absence of client certificates to determine problems in connection with a user's account access. For example, an employee Alice may be interested in accessing the information in a web application provided by a company web server. When accessing the web application, Alice will be asked by the server to provide a client certificate. The ability and willingness of Alice to provide a client certificate can be monitored to determine whether Alice complies with the company's computing policies, such as interacting with the web application from a system certified by the IT department, or using a browser that is set up by the IT department for access to that web application. If Alice habitually fails to provide the client certificate, it may indicate that she is not following the policies. It may also indicate that Alice needs training on the correct procedures for complying with the policies. Similarly, if Alice habitually downloads her email from a system without a client certificate, it may indicate that she has the habit of using an unauthorized system (e.g., her personal laptop), or an unauthorized email client (e.g., an email client that she has downloaded and installed herself). Based on the statistics, Alice's behavior can be detected, and she can be reminded of the company's policies before a more serious security breach occurs in the future.

In some embodiments, the contents of a client certificate can be combined with access credentials (e.g., a user name and password) of a user to detect potential problems involving one or more particular users. One type of problem that can be detected is whether the information in the client certificate submitted by a user matches the user's access credentials. A user's access credentials match the information in the client certificate if the access credentials correctly identify a user who is the owner of the computer having the client certificate. For example, if Alice logs in to a company's web server from Bob's workstation, Alice will submit Bob's client certificate with Alice's user name and password. A pattern of such occurrences may indicate that either Alice or Bob is having problems with their computers, and the workaround they have found is for Alice to log in on Bob's workstation. The situation may indicate that Bob has forgotten his password, or his account has been locked. Rather than calling the help desk to get Bob's password reset, Alice helps Bob to get his work done by allowing him to use her account. The situation may also indicate that an asset of the company (e.g. Bob's workstation) is not where it is expected to be (e.g., on Bob's desk).

To further explain how information in connection with a client certificate can be exploited to provide account access statistics, it is useful to describe how a client certificate is typically used in a login process. Two examples are provided below to illustrate how client certificates are used to establish secure connections with a mail server and a web server, respectively. In an example, a company's mail server (e.g., server 104 of FIG. 1) uses a mail Post Office Protocol (POP) with Secure Socket Layer (SSL) or Transport Layer Security (TLS). When a user at the remote terminal 102 checks his email, the mail agent 128 (e.g., a mail reading software, such as Microsoft Office Outlook or Mozilla Thunderbird) connects to the server 104 and sends a "client hello" (a login request) to start a secure connection (e.g., a SSL connection) to the server 104. The server 104 sends back its server certificate, including its identifying information, such as public key and administrative information, signed by a certifying authority. The server 104 also asks the remote terminal 102 (i.e., the source of the login request) for a client certificate. In a scenario where a client certificate is requested but not required, the server 104 will establish a secure connection even though no client certificate is sent back to the server 104. If the mail agent 128 on the remote terminal 102 has a client certificate, the mail agent will send it back to the server 104. The mail agent 128 may ask the user where to find the client certificate, locates the client certificate and sends it back to the server 104. If the mail agent 128 on the remote terminal 102 is not configured to have a client certificate, the mail agent 128 can ignore the request. The server 104 and its proxy (the computing system 108) will notice the absence of the client certificate, which is an indication that the login request is sent from a terminal likely to be non-secure. In the above scenario where a client certificate is requested but not required, the server 104 establishes a secure connection to the remote terminal 102 regardless of the presence of the client certificate. At this point, the application layer of the mail protocol (POP) is in force. If the client certificate is absent, the computing system 108 will flag the absence as an exception. The mail agent 128 then sends the user name, waits for a request for password, and sends the password to complete the login operations.

In another example, when a user goes to a secure website hosted by a web server (e.g., the server 104 of FIG. 1), the browser 126 on the user's remote terminal 102 connects to the server 104 and requests a secure connection. The server 104 sends a server certificate and requests, without requiring, a client certificate to be sent back. That is, if the browser 126 on the remote terminal 102 is configured to have a client certificate, the client certificate will be sent to the server 104. If the remote terminal 102 does not have the client certificate, the server 104 will notice the absence of the client certificate. The computing system 108, which acts as a proxy of server 104, will also notice the absence of the client certificate, and will flag the absence as an exception. At that point, the browser 126 sends the user name and the password to complete the login operations for accessing the secure website.

Figure 3:
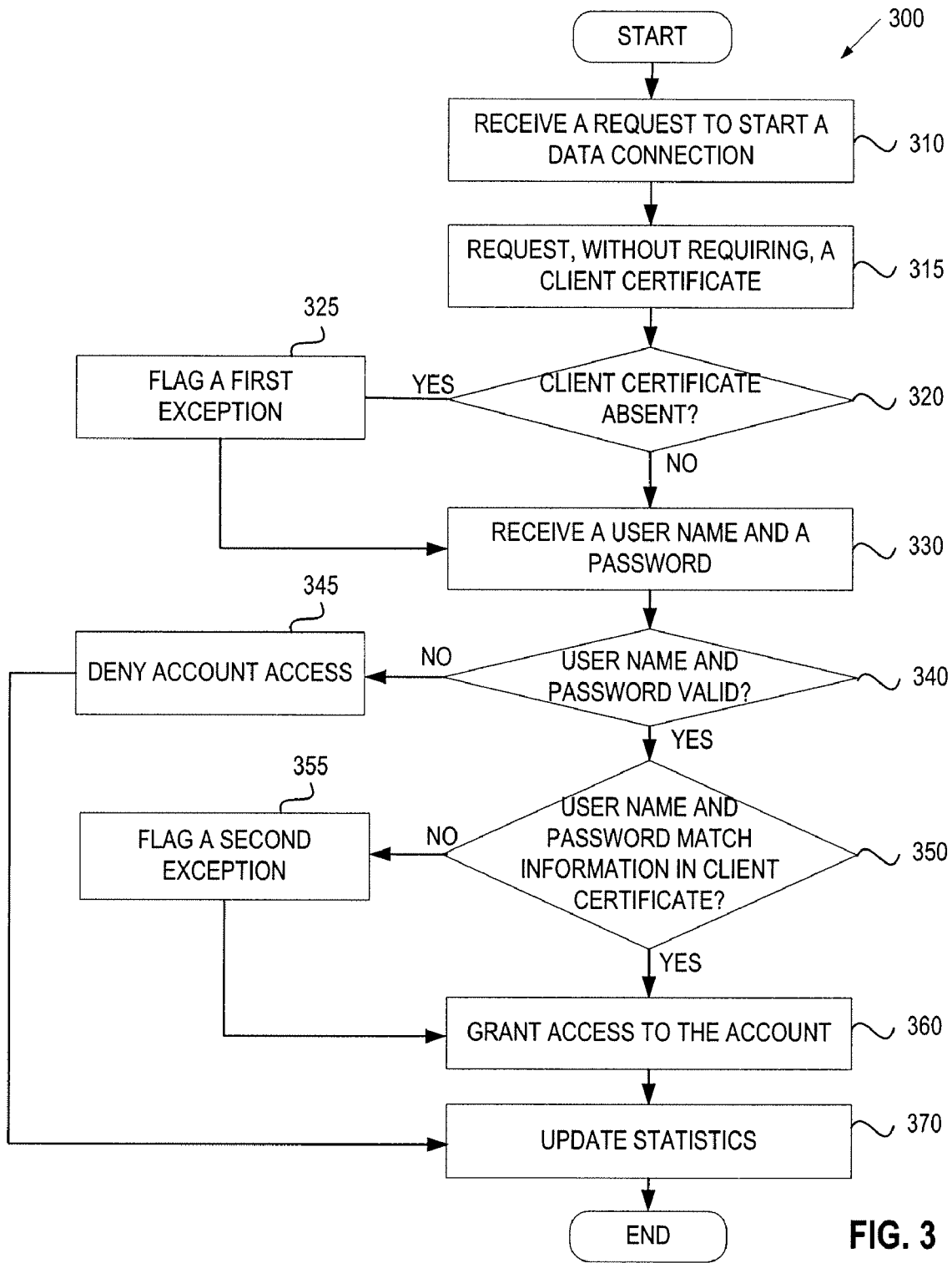
FIG. 3 illustrates a flow diagram of one embodiment of a process for managing account access and updates to account access statistics.

FIG. 3 illustrates a flow diagram of one embodiment of a process 300 for collecting statistics using information provided by the presence of client certificates. Process 300 may be performed by processing logic 526 of FIG. 5 that may comprise hardware (e.g., circuitry, dedicated logic, programmable logic, microcode, etc.), software (such as instructions run on a processing device), or a combination thereof. In one embodiment, process 300 is performed by the computing system 108 of FIG. 1, executing the authentication module 135 for establishing a data connection between one of the remote terminals 102 and the server 104.

Referring to FIG. 3, at block 310, process 300 begins with the computing system 108 receiving a request from one of the remote terminals 102 to start a data connection with the server 104. In response to the request, at block 315, the server 104 sends a server certificate and requests, without requiring, a client certificate in return. If, at block 320, the computing system 108 determines that the client certificate is absent, the authentication module 135 flags a first exception at block 325. Process 300 then continues to block 330 to receive a user name and a password.

At block 330, the computing system 108 receives a user name and a password from the remote terminal 102. At block 340, the authentication module 135 of the computing system 108 compares the received user name and password with the stored version in the password file 106 (of FIG. 1) to determine whether the user name and password are valid. If the user name and password are not valid for the given user name, at block 345, the authentication module 135 denies account access and proceeds to block 370. If the user name and password are valid and a client certificate is present, at block 350, the authentication module 135 determines whether the received user name and password match the information in the client certificate. The user name and password match the information in the client certificate if the user name and password identify a user who is the owner of the computer having the client certificate. If there is a mismatch, at block 355, the authentication module 135 flags a second exception. Process 300 then proceeds to block 360 to grant access to the account associated with the user name and password. If there is a match, process 300 proceeds directly to block 360 to grant access to the account without raising exceptions. At block 370, the authentication module 135 updates the collection of statistics 101 to include the information in the client certificate and the exceptions that have occurred during the login process. However, if the client certificate is absent and the user name and password are invalid, the collection of statistics 101 may remain unchanged, or may be updated based on the Internet Protocol (IP) address and, in some cases, the Media Access Control (MAC) address from which the login request originates. Process 300 then terminates until a next login request is received.

Although not shown in FIG. 3, the collection of statistics 101 may also be updated by the monitoring daemon 130 in a background process that runs asynchronously with the authentication module 135. For example, the monitoring daemon 130 may scan the log file 107 of FIG. 1 to determine whether any account access information can be inferred from past account activities. In one embodiment, the log file 107 may contain the information of the accounts that have been accessed, as well as the presence of the client certificate and the contents of the present client certificate that were associated with the account access. In some embodiments, the background operations performed by the monitoring daemon 130 may supplement the real-time statistical updates performed by the authentication module 135 described in FIG. 3. In alternative embodiments, the statistical updates may be performed entirely in the background by the monitoring daemon 130.

Figure 4:
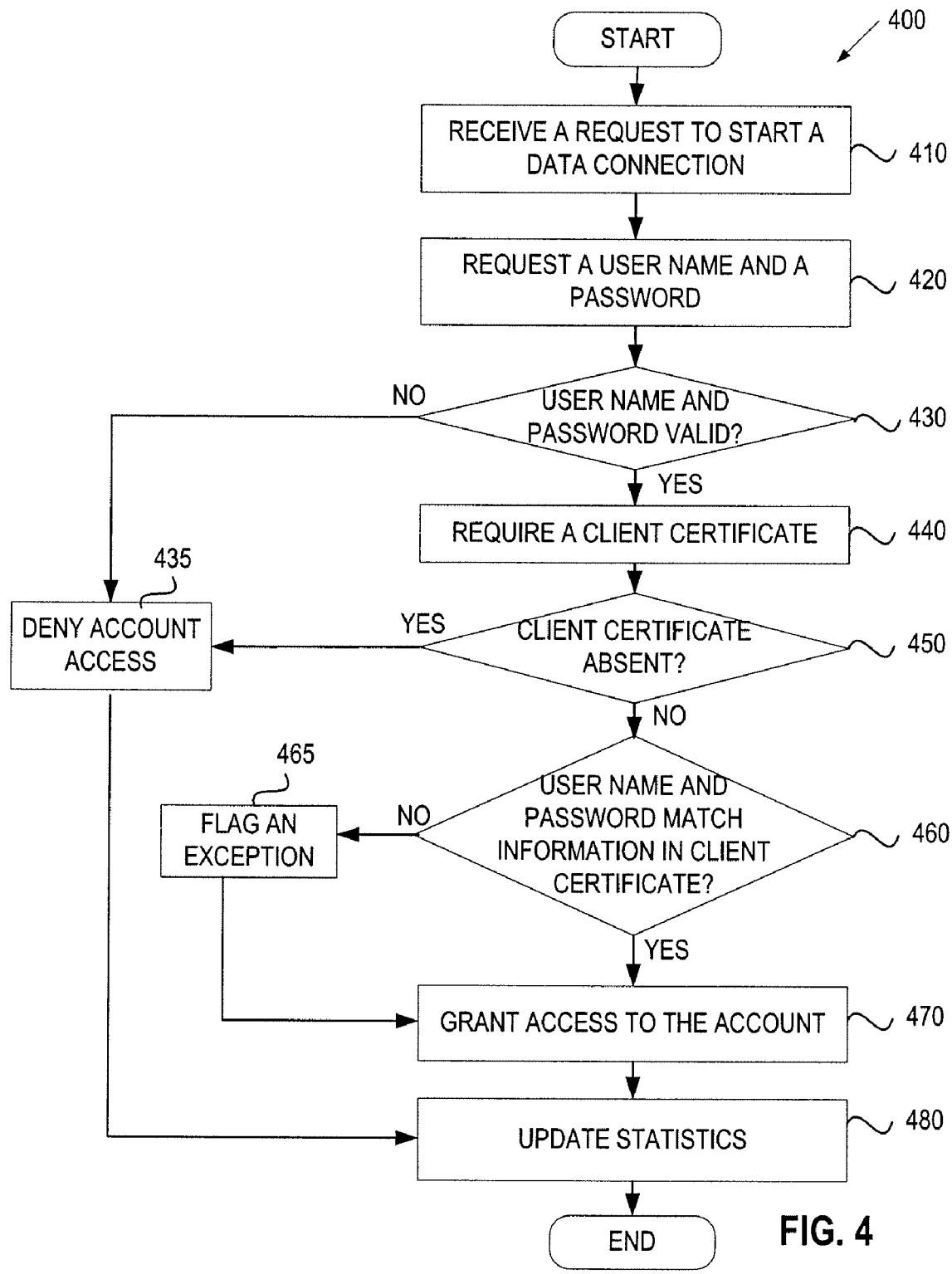
FIG. 4 illustrates a flow diagram of an alternative embodiment of a process for managing account access and updates to account access statistics.

FIG. 4 illustrates a flow diagram of an alternative embodiment of a process 400 for collecting statistics using information provided by the presence of client certificates. Process 400 may be performed by processing logic 526 of FIG. 5 that may comprise hardware (e.g., circuitry, dedicated logic, programmable logic, microcode, etc.), software (such as instructions run on a processing device), or a combination thereof. In one embodiment, process 400 is performed by the computing system 108 of FIG. 1 executing the authentication module 135 for establishing a data connection between one of the remote terminals 102 and the server 104.

Referring to FIG. 4, at block 410, process 400 begins with the computing system 108 receiving a request from one of the remote terminals 102 to start a data connection with the server 104. In response to the request, at block 420, the authentication module 135 requests the user name and password before any certificate is exchanged. At block 430, the authentication module 135 receives the user name and password, and determines whether the user name and the password are valid. If the user name and password are not valid, at block 435, the authentication module 135 denies account access and proceeds to block 480. If the user name and password are valid, at block 440, the authentication module 135 requires a client certificate from the remote terminals 102. If, at block 450, the client certificate is absent, the authentication module 135 denies account access and proceeds to block 480. At this point, even though the user is unable to access his account, account access statistics can be collected to indicate that the user (as identified by the user name and password) has attempted to access his account from a terminal that does not have a client certificate. If, at block 450, the client certificate is present, the authentication module 135 determines whether the received user name and password match the information in the client certificate. If there is a mismatch, at block 465, the authentication module 135 flags an exception and proceeds to block 470 to grant access to the account associated with the user name and password. If there is a match, process 400 proceeds directly to block 470 to grant access to the account without raising exceptions. At block 480, the authentication module 135 updates the collection of statistics 101 to include the information in the client certificate and the exceptions that have occurred during the login process. However, if the client certificate is absent and the user name and password are invalid, the collection of statistics 101 may remain unchanged, or may be updated based on the Internet Protocol (IP) address and, in some cases, the MAC address from which the login request originates. Process 400 then terminates until a next login request is received.

Similar to process 300, the collection of statistics 101 may also be updated by the monitoring daemon 130 in a background process. This background process may supplement the real-time statistical updates performed by the authentication module 135 described in FIG. 4. In alternative embodiments, the statistical updates may be performed entirely in the background by the monitoring daemon 130.

In process 400, if the client certificate is required before the access credentials are required (e.g., before the user name and password are submitted and authenticated), the computing system 108 will obtains no data about who attempted to log in, except an IP address, and possibly, a MAC address. By requiring a client certificate after the receipt of the access credentials of a user, the computing system 108 is able to obtain the statistics of user information, as well as the presence/absence of a client certificate and the contents of the client certificate that is present. Process 400 is useful in a scenario where the identity of the certification authority issuing the client certificate is unknown until an account name is provided. This scenario may occur when a service provider hosts applications for multiple different organizations. Thus, after receiving the access credentials of a user, the server 104 knows which organization signed the client certificate it is expecting, and can then proceed to establish a secure connection with the remote terminal 102.

Figure 5:
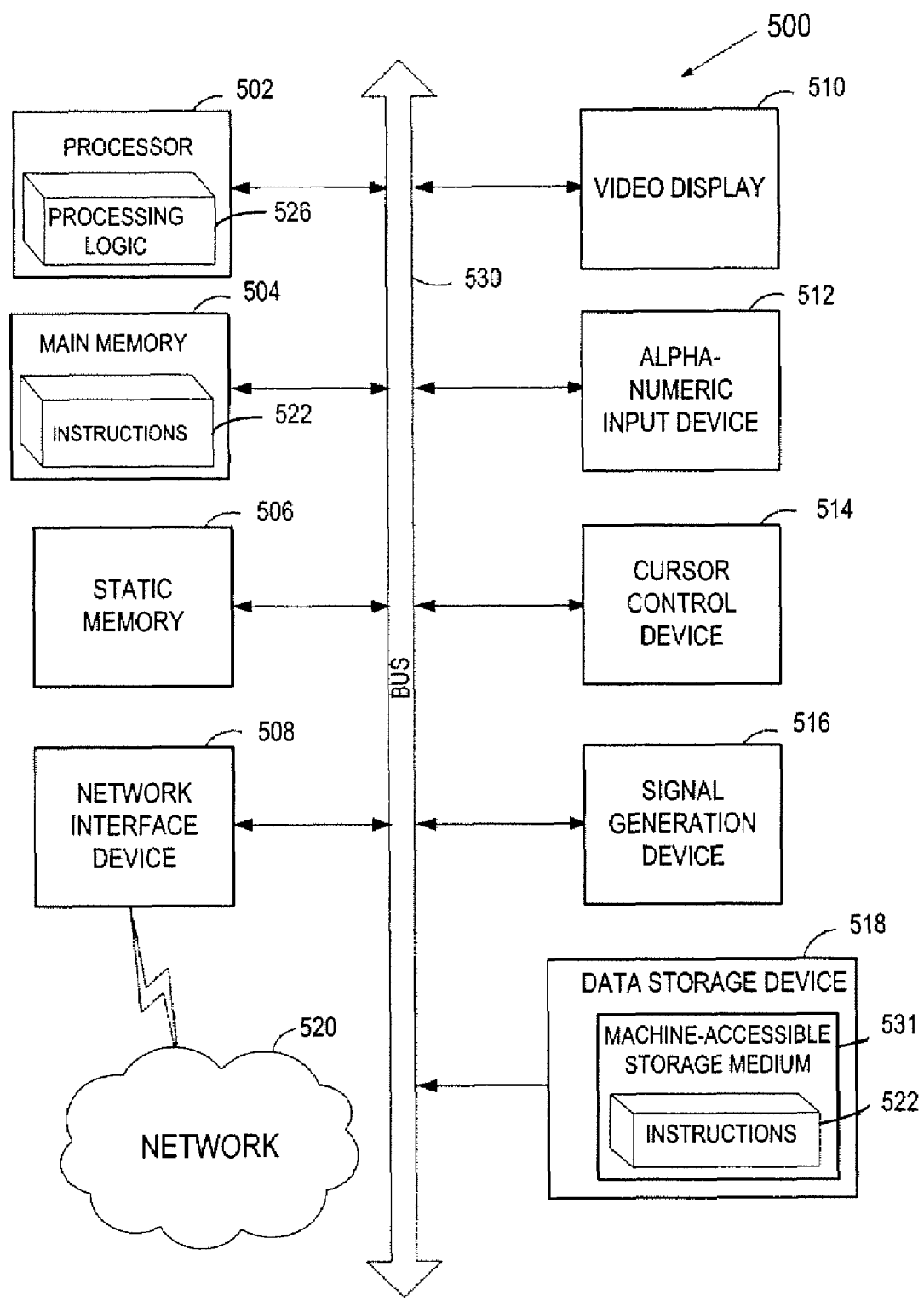
FIG. 5 illustrates a block diagram of an exemplary computer system implementing some embodiments of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a device machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

The machine-readable storage medium 531 may also be used to store the monitoring daemon 130 and the authentication module 135 of FIG. 1, and/or the collection of statistics 101, the log file 107 and the password file 106. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Thus, a method and a system for collecting statistics from information provided by the presence of client certificates have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   requesting, by a computer system, a client certificate from a remote terminal that requests to access a computing resource, the client certificate identifying the remote terminal and an authorized user of the remote terminal, wherein the client certificate is not used by the computer system to determine access to the computing resource;
   receiving, by the computer system, access credentials of a user from the remote terminal, wherein the access credentials are used by the computer system to grant access to the computer resource;
   determining whether the client certificate is provided by the remote terminal, and if so, determining whether information of the authorized user in the client certificate matches the access credentials of the user; and
   updating account access statistics to show whether the access of the computing resource was associated with a client certificate and whether such client certificate matched the access credentials of the user.

2. The method of claim 1, wherein updating account access statistics further comprises:
   collecting the account access statistics of users who fail to provide client certificates.

3. The method of claim 1, wherein updating account access statistics further comprises:
   collecting the account access statistics of users whose access credentials do not match information in client certificates provided by the users.

4. The method of claim 1, further comprising:
   identifying, from the account access statistics, an indication of non-compliance with a company policy.

5. The method of claim 1, wherein updating statistics further comprises:
   updating the account access statistics in a real-time process that manages account access.

6. The method of claim 1, wherein updating statistics further comprises:
   scanning a log file, in a background process, to update the account access statistics.

7. A system comprising:
   data storage to store a collection of statistics; and
   a computing entity coupled to the data storage, the computing entity to request a client certificate from a remote terminal that requests to access a computing resource, wherein the client certificate identifies the remote terminal and an authorized user of the remote terminal and is not used by the computer system to determine access to the computing resource, the computer entity to:
   receive access credentials of a user from the remote terminal, wherein the access credentials are used by the computer system to grant access to the computer resource,
   determining whether the client certificate is provided by the remote terminal, and if so, determining whether information of the authorized user in the client certificate matches the access credentials of the user, and
   update account access statistics to show whether the access of the computing resource was associated with a client certificate and whether such client certificate matched the access credentials of the user.

8. The system of claim 7, wherein the account access statistics comprises the account access statistics of users who fail to provide client certificates.

9. The system of claim 7, wherein the account access statistics comprises the account access statistics of users whose access credentials do not match information in client certificates provided by the users.

10. The system of claim 7, wherein the computing resource is a web application or a mail application.

11. A non-transitory computer readable storage medium including instructions that, when executed by a processing system, cause the processing system to perform a method comprising:
    requesting a client certificate from a remote terminal that requests to access a computing resource, the client certificate identifying the remote terminal and an authorized user of the remote terminal, wherein the client certificate is not used by the computer system to determine access to the computing resource;
    receiving access credentials of a user from the remote terminal, wherein the access credentials are used by the computer system to grant access to the computer resource;
    determining whether the client certificate is provided by the remote terminal, and if so, determining whether information of the authorized user in the client certificate matches the access credentials of the user; and
    updating account access statistics to show whether the access of the computing resource was associated with a client certificate and whether such client certificate matched the access credentials of the user.

12. The computer readable storage medium of claim 11, wherein updating account access statistics further comprises:
    collecting the account access statistics of users who fail to provide client certificates.

13. The computer readable storage medium of claim 11, wherein updating account access statistics further comprises:
    collecting the account access statistics of users whose access credentials do not match information in client certificates provided by the users.

14. The computer readable storage medium of claim 11, wherein further comprising:
    identifying, from the statistics, an indication of non-compliance with a company policy.

* * * * *